United States Patent
Hino et al.

(10) Patent No.: US 6,914,612 B2
(45) Date of Patent: Jul. 5, 2005

(54) IMAGE DRAWING METHOD, IMAGE DRAWING APPARATUS, RECORDING MEDIUM, AND PROGRAM

(75) Inventors: Akihiro Hino, Fukuoka-ken (JP); Kentaro Motomura, Tokyo (JP)

(73) Assignee: Sony Computer Entertainment Inc. (JP)

( * ) Notice: Subject to any disclaimer, the term of this patent is extended or adjusted under 35 U.S.C. 154(b) by 313 days.

(21) Appl. No.: 09/784,852

(22) Filed: Feb. 16, 2001

(65) Prior Publication Data

US 2001/0022586 A1 Sep. 20, 2001

(30) Foreign Application Priority Data

Feb. 17, 2000 (JP) .......................... 2000-040224
Jan. 24, 2001 (JP) .......................... 2001-015428

(51) Int. Cl.$^7$ ................................ G09G 5/00
(52) U.S. Cl. ................ 345/582; 345/474; 345/589; 345/626; 345/627; 345/629
(58) Field of Search .............. 345/473, 474, 345/582, 589, 626, 627, 629, 638, 647, 672

(56) References Cited

U.S. PATENT DOCUMENTS 5,325,480 A    6/1994   Rice
6,121,977 A  * 9/2000   Arai et al. .............. 345/619

FOREIGN PATENT DOCUMENTS

| FR | 2 676 573 A1 | 11/1992 |
| JP | 9-10435      | 1/1997  |
| JP | 10-124700    | 5/1998  |
| JP | 11-86025     | 3/1999  |

* cited by examiner

Primary Examiner—Matthew C. Bella
Assistant Examiner—Antonio Caschera
(74) Attorney, Agent, or Firm—Lerner, David, Littenberg, Krumholz & Mentlik, LLP

(57) ABSTRACT

An image drawing technique includes a method of drawing a randomly changing image of an object and a method of drawing a revised image including a shimmering image in a background image. The method of drawing a randomly changing image of an object establishes a drawing pattern of the object, the drawing pattern including a plurality of extraction areas, each extraction area including a portion of the drawing pattern. A portion of the drawing pattern is extracted from one of the extraction areas and is combined with a randomly selected mask pattern to draw a composite image which is output on a monitor. The extracting and combining steps are repeated for a next extraction area located at a predetermined distance in a defined direction from a previous extraction area. The method of drawing a revised image includes randomly altering a portion of the background image to generate an altered image, and combining the altered image and another mask pattern to generate another composite image. The another composite image is combined with a remaining portion of the background image to draw the revised image. The another composite image and the revised image are output for display on a monitor.

13 Claims, 9 Drawing Sheets

F I G. 3
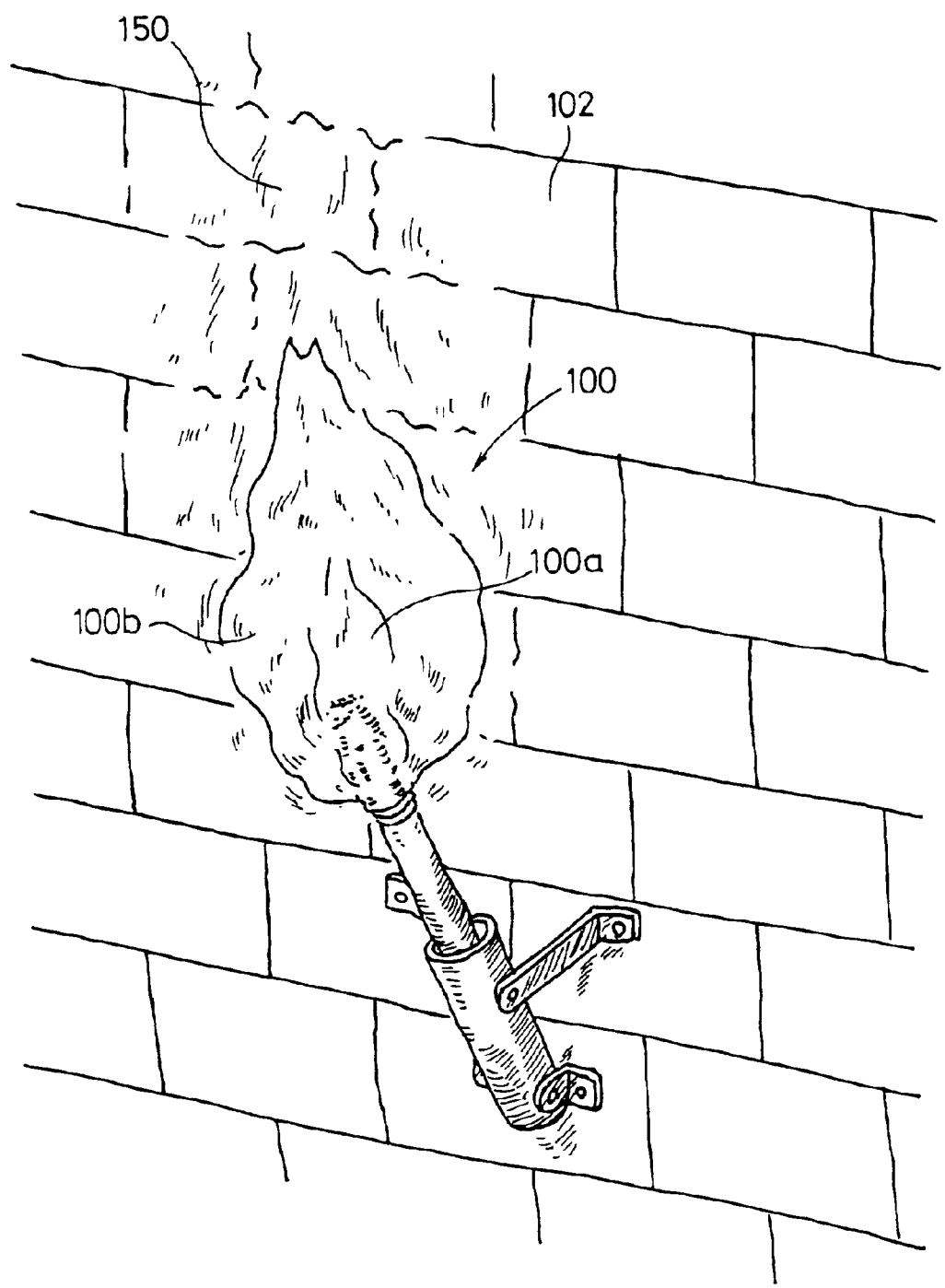

IMAGE DRAWING METHOD, IMAGE DRAWING APPARATUS, RECORDING MEDIUM, AND PROGRAM

BACKGROUND OF THE INVENTION

The present invention relates to an image drawing method and an image drawing apparatus. Further, the present invention relates to a recording medium which stores a program for carrying out image processing, and the program itself.

In recent years, there has been a rapid advancement of computer graphics techniques, such as hidden line removal, hidden surface removal, smooth shading, and texture mapping thanks to the dramatic development of hardware.

Generally, with computer graphics techniques, images are generated by the following procedure. Firstly, a plurality of three-dimensional objects are generated by three-dimensional modeling. Then, rendering is performed by adding optical properties such as specular reflection, diffuse reflection, refraction, and transparency to the objects using shading techniques, by adding surface patterns to the objects, and by plotting images depending on surroundings, such as a window and scenery reflections and ambient light.

According to a conventional method, the movement of fluid, such as flowing water or flowing smoke, can be drawn by randomly moving many objects, and thereafter mapping a texture image of water or smoke on each of the objects.

In rendering a polygon, generally, a perspective transformation is performed for each vertex of the polygon by a geometry processor and the transformed polygon is drawn by a drawing processor in an image memory for displaying images.

For example, it is assumed that "n" objects are randomly moved, and thereafter, a texture image is mapped on each of the objects. In this example, the above described process for rendering a polygon needs to be performed for each of the "n" objects. That is, the perspective transformation needs to be performed "n" times for each vertex of the polygons, and the drawing operation needs to be performed "n" times for each of the polygons.

Since many objects are required to make the flowing water or flowing smoke realistic, considerable time and complicated calculations are needed for the above rendering process. As a result, the objects are displayed at a slow speed on a monitor.

SUMMARY OF THE INVENTION

The present invention has been made taking the above problem into account, and an object of which is to provide an image drawing method, an image drawing apparatus, a recording medium, and a program which make it easier to draw a randomly changing image of an object such as a flame.

Another object of the present invention is to provide an image drawing method, an image drawing apparatus, a recording medium, and a program which make it easier to draw a shimmering object or area which shimmers under the influence of heat waves of a flame, exhaust air or the like.

Another object of the present invention is to provide an image drawing method, an image drawing apparatus, a recording medium, and a program which make it easier to draw a randomly changing image of an object such as a flame and a shimmering object or area around the randomly changing image.

According to an image drawing method of the present invention, a randomly changing image of an object is drawn by establishing a drawing pattern of the object, the drawing pattern including a plurality of extraction areas, each extraction area including a portion of the drawing pattern;

extracting the portion of the drawing pattern from one of the extraction areas;

combining the extracted portion of the drawing pattern and a mask pattern to draw a composite image; and repeating the extracting and combining steps for a next extraction area located at a predetermined distance in a defined direction from a previous extraction area.

An image drawing apparatus of the present invention for drawing a randomly changing image of an object includes means for establishing a drawing pattern of the object, the drawing pattern including a plurality of extraction areas, each extraction area including a portion of the drawing pattern;

means for extracting the portion of the drawing pattern from one of the extraction areas such that the one extraction area is advanced by a predetermined distance in a defined direction after each extraction; and means for combining the extracted portion of the drawing pattern and a mask pattern to draw a composite image.

In a recording medium of the present invention, a recording medium is recorded with a program and data for drawing a randomly changing image of an object, the program including establishing a drawing pattern of the object, the drawing pattern including a plurality of extraction areas, each extraction area including a portion of the drawing pattern;

extracting the portion of the drawing pattern from one of the extraction areas;

combining the extracted portion of the drawing pattern and a mask pattern to draw a composite image; and repeating the extracting and combining steps for a next extraction area located at a predetermined distance in a defined direction from a previous extraction area.

According to a program of the present invention, a program readable and executable by a computer for drawing a randomly changing image of an object includes establishing a drawing pattern of the object, the drawing pattern including a plurality of extraction areas, each extraction area including a portion of the drawing pattern;

extracting the portion of the drawing pattern from one of the extraction areas;

combining the extracted portion of the drawing pattern and a mask pattern to draw a composite image;

outputting the composite image for display on a monitor; and repeating the extracting, combining and outputting steps for a next extraction area located at a predetermined distance in a defined direction from a previous extraction area.

Thus, according to the present invention, a processing sequence establishes a drawing pattern of an object, the drawing pattern including a plurality of extraction areas, each extraction area including a portion of the drawing pattern, extracts the portion of the drawing pattern from one of the extraction areas, and combines the extracted portion of the drawing pattern and a mask pattern to draw a composite image. The processing sequence is repeated as the extraction area is shifted by a predetermined distance in a defined direction after each extracting step. Accordingly, it is possible to generate a drawing pattern showing an object having a variously (randomly) changing shape.

That is, according to the present invention, it is possible to easily draw a randomly changing image of an object, such as a flame, smoke or flowing water. Such an image can be utilized, for example, for drawing a background image for allowing a user to enjoy an exciting game.

The above processing sequence may further include randomly selecting the mask pattern from a plurality of mask patterns.

According to another image drawing method of the present invention, a revised image including a shimmering image is drawn in a background image by randomly altering a portion of the background image to generate an altered image;

combining the altered image and a mask pattern to generate a composite image;

combining the composite image and a remaining portion of the background image to draw a revised image; and repeating the randomly altering step and the combining steps.

Another image drawing apparatus of the present invention draws a revised image including a shimmering image and a background image. The apparatus includes means for randomly altering a portion of the background image to generate an altered image;

means for combining the altered image and a mask pattern to generate a composite image; and means for combining the composite image and a remaining portion of the background image to draw a revised image.

Another recording medium in accordance with the present invention is recorded with a program and data for drawing a revised image including a shimmering image and a background image, the program including randomly altering a portion of the background image to generate an altered image;

combining the altered image and a mask pattern to generate a composite image;

combining the composite image and a remaining portion of the background image to draw a revised image; and repeating the randomly altering step and the combining steps.

According to another program of the present invention, a program readable and executable by a computer for drawing a revised image including a shimmering image and a background image includes randomly altering a portion of the background image to generate an altered image;

combining the altered image and a mask pattern to generate a composite image;

combining the composite image and a remaining portion of the background image to draw a revised image;

outputting the revised image for display on a monitor; and repeating the randomly altering step, the combining steps and the outputting step.

Thus, according to the present invention, a processing sequence randomly alters a portion of the background image to generate an altered image, combines the altered image and a mask pattern to generate a composite image, and combines the composite image and a remaining portion of the background image to draw a revised image. The randomly altering step and the combining steps are repeated to generate a shimmering area having a variously changing shape in the background image.

That is, according to the present invention, it is possible to easily draw a realistic image of a shimmering image of an object or an area which shimmers under the influence of heat waves of a flame, exhaust air or the like. Such an image can be utilized, for example, for drawing an area around a flame or exhaust air from a motor vehicle in a background for allowing a user to enjoy an exciting video game.

In the last-described processing sequence, the randomly altering step may include capturing the portion of the background image as a texture image and drawing the texture image in a predetermined texture area;

randomly selecting an animation pattern from a plurality of animation patterns; and altering the texture image according to the selected animation pattern to form the altered image.

According to a still further image drawing method of the present invention, a randomly changing image of an object is drawn and a shimmering image is drawn around the randomly changing image. The method includes randomly altering a portion of a background image to generate an altered image;

combining the altered image and a mask pattern to draw a composite image;

combining the composite image and a remaining portion of the background image to generate a revised image;

establishing a drawing pattern of the object, the drawing pattern including a plurality of extraction areas, each extraction area including a portion of the drawing pattern;

extracting the portion of the drawing pattern from one of the extraction areas;

combining the extracted portion of the drawing pattern and another mask pattern to generate another composite image;

combining the another composite image and the revised image to draw a combined image; and repeating the extracting step, the step of combining the extracted portion and the another mask, and the step of combining the another composite image and the revised image for a next extraction area located at a predetermined distance in a defined direction from a previous extraction area.

A still further image drawing apparatus in accordance with the present invention draws a randomly changing image of an object and a shimmering image around the randomly changing image. The image drawing apparatus includes means for randomly altering a portion of a background image to generate an altered image;

means for combining the altered image and a mask pattern to draw a composite image;

means for combining said composite image and a remaining portion of said background image to generate a revised image;

means for establishing a drawing pattern of the object, the drawing pattern including a plurality of extraction areas, each extraction area including a portion of the drawing pattern;

means for extracting the portion of the drawing pattern from one of the extraction areas such that the one extraction area is advanced by a predetermined distance in a defined direction after each extraction;

means for combining the extracted portion of the drawing pattern and another mask pattern to generate another composite image; and means for combining the another composite image and the revised image to draw a combined image.

A further recording medium in accordance with the present invention is recorded with a program and data for drawing a randomly changing image of an object and a shimmering image around the randomly changing image. The program includes randomly altering a portion of a background image to generate an altered image;

combining the altered image and a mask pattern to draw a composite image;

combining the composite image and a remaining portion of the background image to generate a revised image;

establishing a drawing pattern of the object, the drawing pattern including a plurality of extraction areas, each extraction area including a portion of the drawing pattern;

extracting the portion of the drawing pattern from one of the extraction areas;

combining the extracted portion of the drawing pattern and another mask pattern to generate another composite image;

combining the another composite image and the revised image to draw a combined image; and repeating the extracting step, the step of combining the extracted portion and the another mask, and the step of combining the another composite image and the revised image for a next extraction area located at a predetermined distance in a defined direction from a previous extraction area.

In accordance with a further program of the present invention readable and executable by a computer, a randomly changing image of an object is drawn, and a shimmering image is drawn around the randomly changing image, the program including randomly altering a portion of a background image to generate an altered image;

combining the altered image and a mask pattern to draw a composite image;

combining the composite image and a remaining portion of the background image to generate a revised image;

establishing a drawing pattern of the object, the drawing pattern including a plurality of extraction areas, each extraction area including a portion of the drawing pattern;

extracting the portion of the drawing pattern from one of the extraction areas;

combining the extracted portion of the drawing pattern and another mask pattern to generate another composite image;

combining the another composite image and the revised image to draw a combined image;

outputting the combined image for display on a monitor; and repeating the extracting step, the step of combining the extracted portion and the another mask, the step of combining the another composite image and the revised image, and the outputting step for a next extraction area located at a predetermined distance in a defined direction from a previous extraction area.

Thus, according to the present invention, a processing sequence randomly alters a portion of a background image to generate an altered image, combines the altered image and a mask pattern to generate a composite image, combines the composite image and a remaining portion of the background image to generate a revised image, establishes a drawing pattern of the object, the drawing pattern including a plurality of extraction areas, each extraction area including a portion of the drawing pattern, extracts the portion of the drawing pattern from one of the extraction areas, combines the extracted portion of the drawing pattern and another mask pattern to generate another composite image, and combines the another composite image and the revised image to draw a combined image. The sequence is repeated to generate a drawing pattern showing a variously (randomly) changing object, and a variously changing (shimmering) area around the object in the background image.

That is, according to the present invention, it is possible to easily draw a realistic randomly changing image of an object, such as a flame, smoke or flowing water, and a realistic shimmering image around the randomly changing image. Such images can be utilized, for example, for drawing a randomly changing flame and a shimmering area around the flame in a background image for allowing a user to enjoy an exciting video game.

The foregoing processing sequence may include capturing the portion of the background image as a texture image and drawing the texture image in a predetermined area;

randomly selecting an animation pattern from a plurality of animation patterns; and altering the textured image according to the selected animation pattern to form the altered image.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a view showing a flame as an example of a randomly changing object and a shimmering area around the flame in a background image;

DESCRIPTION OF THE PREFERRED EMBODIMENT

An embodiment of an image drawing method, an image drawing apparatus, a recording medium, and a program according to the present invention as applied to an entertainment system for executing various programs (hereinafter simply referred to as the entertainment system according to the present invention) will be described with reference to the drawings.

Figure 1:
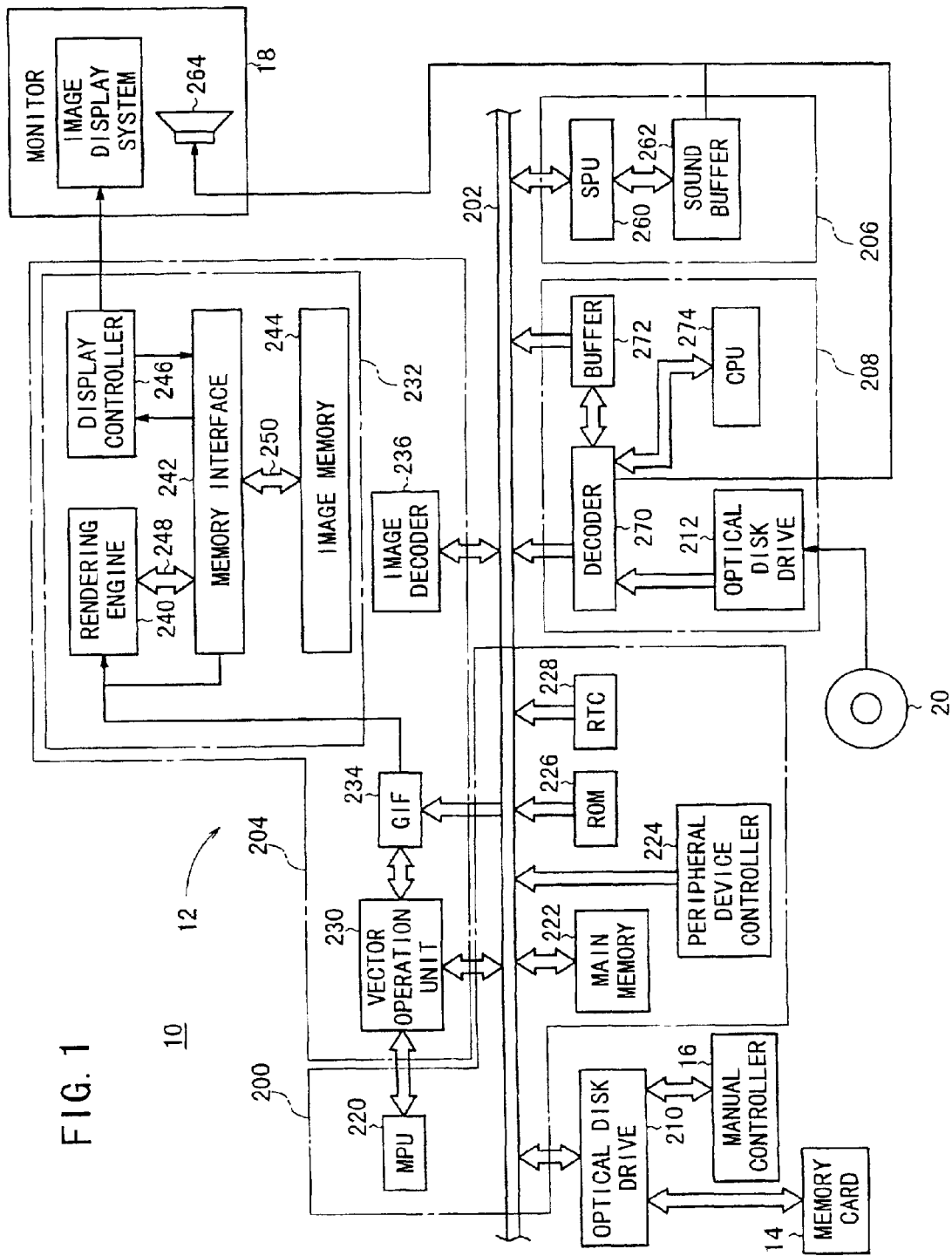
FIG. 1 is a view showing an arrangement of an entertainment system according to the present invention.

As shown in FIG. 1, the entertainment system 10 according to the present invention basically comprises an entertainment apparatus 12 for executing various programs, a memory card 14 detachably connected to the entertainment apparatus 12, a manual controller 16 detachably connected to the entertainment apparatus 12, and a monitor (display) 18, such as a television receiver, which is supplied with video and audio signals from the entertainment apparatus 12.

The entertainment apparatus 12 reads a program recorded in a mass storage medium, such as an optical disk 20 such as a CD-ROM or the like, and executes a game, for example, based on the program depending on commands supplied from a user, e.g., a game player, via the manual controller 16. The execution of the game mainly represents controlling the progress of the game by controlling the display of images and the generation of sounds on the monitor 18 based on manual input actions entered from the manual controller 16.

As shown in FIG. 1, the entertainment apparatus 12 generally comprises a control system 200, a graphic generating system 204 connected to the control system 200 via a system bus 202, a sound generating system 206 connected to the control system 200 via the system bus 202, and an optical disk control system 208 connected to the control system 200 via the system bus 202. A communication controller 210 for controlling data to be inputted to and outputted from the manual controller 16 and the memory card 14 is also connected to the control system 200 via the system bus 202.

The manual controller 16 supplies commands (including manipulation data) from the user via the communication controller 210 and another unillustrated communication controller to the entertainment apparatus 12. The optical disk control system 208 includes an optical disk drive 212 in which the optical disk 20 is loaded. The optical disk 20 may comprise a CD-ROM or the like as a specific example of a recording medium according to the present invention.

The control system 200 controls motions of characters displayed on the monitor 18 based on a program and data read from the optical disk 20 and commands supplied from the manual controller 16.

The control system 200 includes a micro processing unit (MPU) 220, a main memory 222, a peripheral device controller 224, a ROM 226, and a real-time clock (RTC) 228. The MPU 220 controls the entertainment system 12. The main memory 222 stores various programs to be executed and various data. That is, the main memory 222 at least stores a game program so that the game program can be executed on the main memory 222. The peripheral device controller 224 controls interrupts and direct memory access (DMA) data transfer. The ROM 226 stores various programs such as an operating system for managing the graphic system 204, the sound generating system 206, etc. Further, the ROM 226 stores information for controlling kernel or the like, and information for performing an OSD function.

The MPU 220 controls the entertainment apparatus 12 in its entirety by executing the operating system stored in the ROM 226. The MPU 220 may comprise a 32-bit RISC-CPU, for example.

When the entertainment apparatus 12 is turned on, the MPU 220 executes the operating system stored in the ROM 226 to start controlling the graphic generating system 204, the sound generating system 206, etc.

When the operating system is executed, the MPU 220 initializes the entertainment apparatus 12 in its entirety for checking its operation, and thereafter controls the optical disc control system 208 to execute an application program, such as a game program recorded in the optical disk 20.

As the application program, such as a game program, is executed, the MPU 220 controls the graphic generating system 204, the sound generating system 206, etc. depending on commands entered from the user for thereby controlling the display of images and the generation of music sounds and sound effects.

The graphic generating system 204 comprises a vector operation unit 230 for performing floating-point vector operations required for geometry processing, an image processor 232 for generating image data under the control of the MPU 220 and outputting the generated image data to a monitor 18, e.g., a CRT, a graphic interface (GIF) 234 for serving as transfer paths between the MPU 220, the vector operation unit 230, and the image processor 232, and an image decoder 236 for decoding image data compressed and encoded by an orthogonal transform, such as a discrete cosine transform.

The image processor 232 comprises a rendering engine 240, a memory interface 242, an image memory 244, and a display controller 246, such as a programmable CRT controller or the like.

The rendering engine 240 serves to render and store image data in the image memory 244 via the memory interface 242 based on a rendering command supplied from the MPU 220.

A first bus 248 is connected between the memory interface 242 and the rendering engine 240, and a second bus 250 is connected between the memory interface 242 and the image memory 244. Each of the first and second buses 248, 250 has a 128-bit width, for example, for allowing the rendering engine 240 to render and store image data in the image memory 244 at a high speed.

The rendering engine 240 is capable of rendering image data of 320×240 pixels or image data of 640×480 pixels according to the NTSC or PAL system on a real-time fashion, i.e., more than ten times to several ten times in 1/60 seconds to 1/30 seconds.

Figure 2:
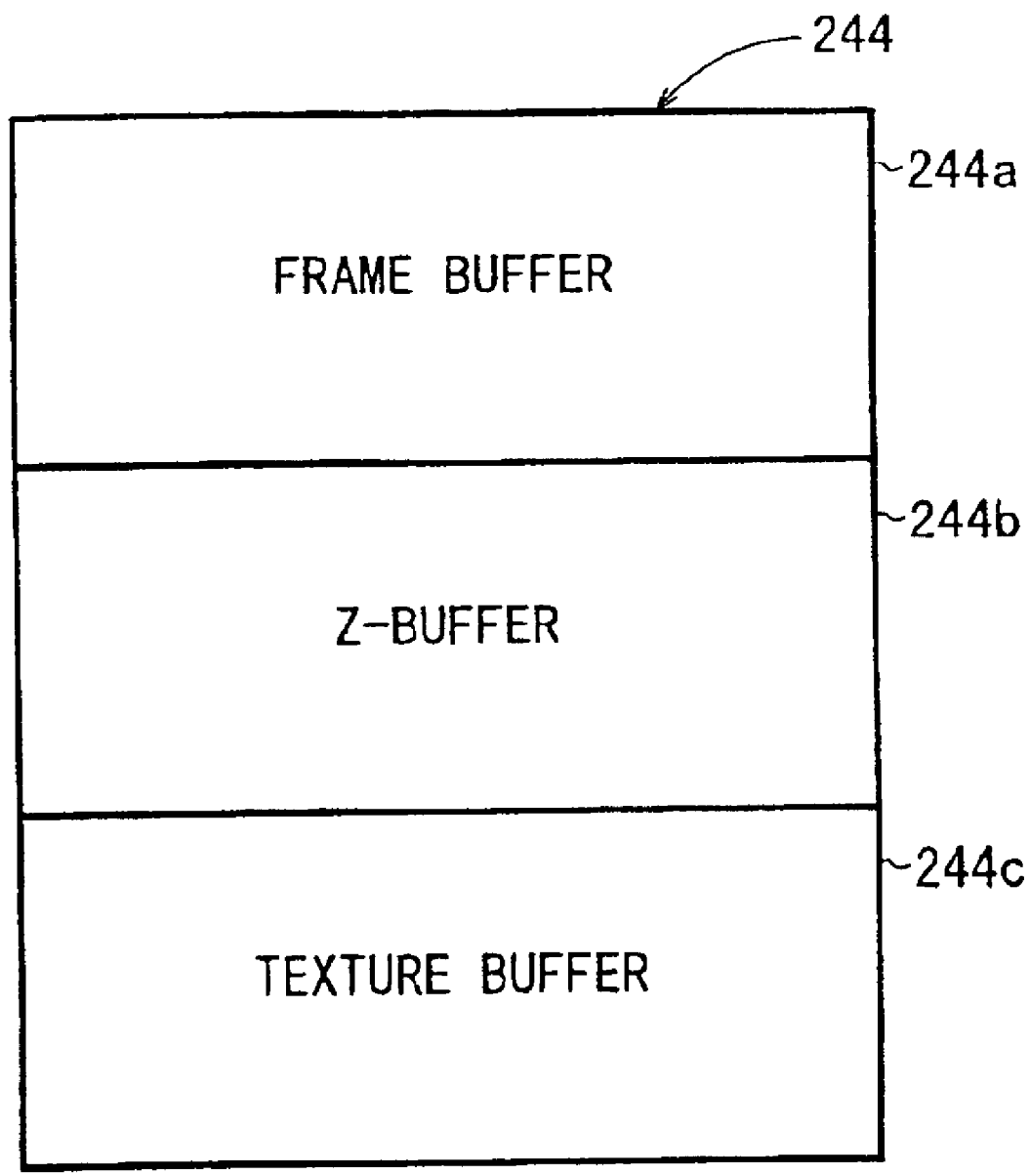
FIG. 2 is a view showing an example of addressing an image memory.

The image memory 244 is a unified memory structure that is able to designate a texture rendering area and a display rendering area as the same area. For example, in FIG. 2, a frame buffer 244$a$, a Z-buffer 244$b$, and a texture buffer 244$c$ are designated by logical addressing in the image memory 244, respectively. Alternatively, the Z-buffer may be separately designated in another memory by physical addressing.

As shown in FIG. 1, the display controller 246 writes texture data read from the optical disk 20 via the optical disk drive 212 or texture data generated in the main memory 222 via the memory interface 242 into the texture buffer 244$c$ of the image memory 244, and reads image data stored in the frame buffer 244$a$ of the image memory 244 via the memory interface 242 and outputs the read image data to the monitor 18 to display an image on its display screen.

The sound generating system 206 comprises a sound processing unit (SPU) 260 for generating music sounds, sound effects, etc. based on instructions from the MPU 220, and a sound buffer 262 for storing music sounds, sound effects, etc. generated by the SPU 260. Audio signals representing music sounds, sound effects, etc. generated by the SPU 260 are supplied to audio terminals of the monitor 18. The monitor 18 has a speaker 264 which radiates music sounds, sound effects, etc. generated by the SPU 260 based on the supplied audio signals.

The SPU 260 has an ADPCM (adaptive differential PCM) function for reproducing 16-bit sound data which has been encoded as 4-bit differential sound data by ADPCM, a reproducing function for reproducing waveform data stored in the sound buffer 262 to generate sound effects, etc., and a modulating function for modulating and reproducing the waveform data stored in the sound buffer 262.

The sound system 206 with these functions can be used as a sampling sound source which generates music sounds, sound effects, etc. based on the waveform data stored in the sound buffer 262 according to instructions from the MPU 220.

The optical disk control system 208 comprises an optical disk drive 212 for reproducing application programs and data recorded on the optical disk 20, a decoder 270 for decoding programs and data that are recorded with an error correcting code added thereto, and a buffer 272 for ing code added thereto, and a buffer 272 for temporarily storing data read from the optical disk drive 212 so as to allow the data from the optical disk 20 to be read at a high speed. A CPU 274 is connected to the decoder 270.

Sound data recorded on the optical disk 20 which is read by the optical disk drive 212 includes PCM data converted from analog sound signals, in addition to the ADPCM data.

The ADPCM data, which is recorded as 4-bit differential data of 16-bit digital data, is decoded by the decoder 270, supplied to the SPU 260, converted thereby into analog data, and applied to drive the speaker 264.

The PCM data, which is recorded as 16-bit digital data, is decoded by the decoder 270 and then applied to drive the speaker 264.

Next, two characteristic functions of the entertainment system 10 according to an embodiment of the present invention will be described with reference to FIGS. 3 through 9.

The first characteristic function of the entertainment system 10 is to draw an object such as a flame whose shape changes randomly. The second characteristic function of the entertainment system 10 is to draw a shimmering object or area which shimmers (wavers) under the influence of heat waves of a flame, exhaust air or the like.

As a specific example, FIG. 3 shows an animation of a torch burning with a flickering flame 100 on a wall 102. The shape of the flame 100 changes randomly. Further, an area 150 of the wall 102 around the flame 100 shimmers under the influence of heat of the flame 100. The drawing process of the animation will be described below.

Figure 4:
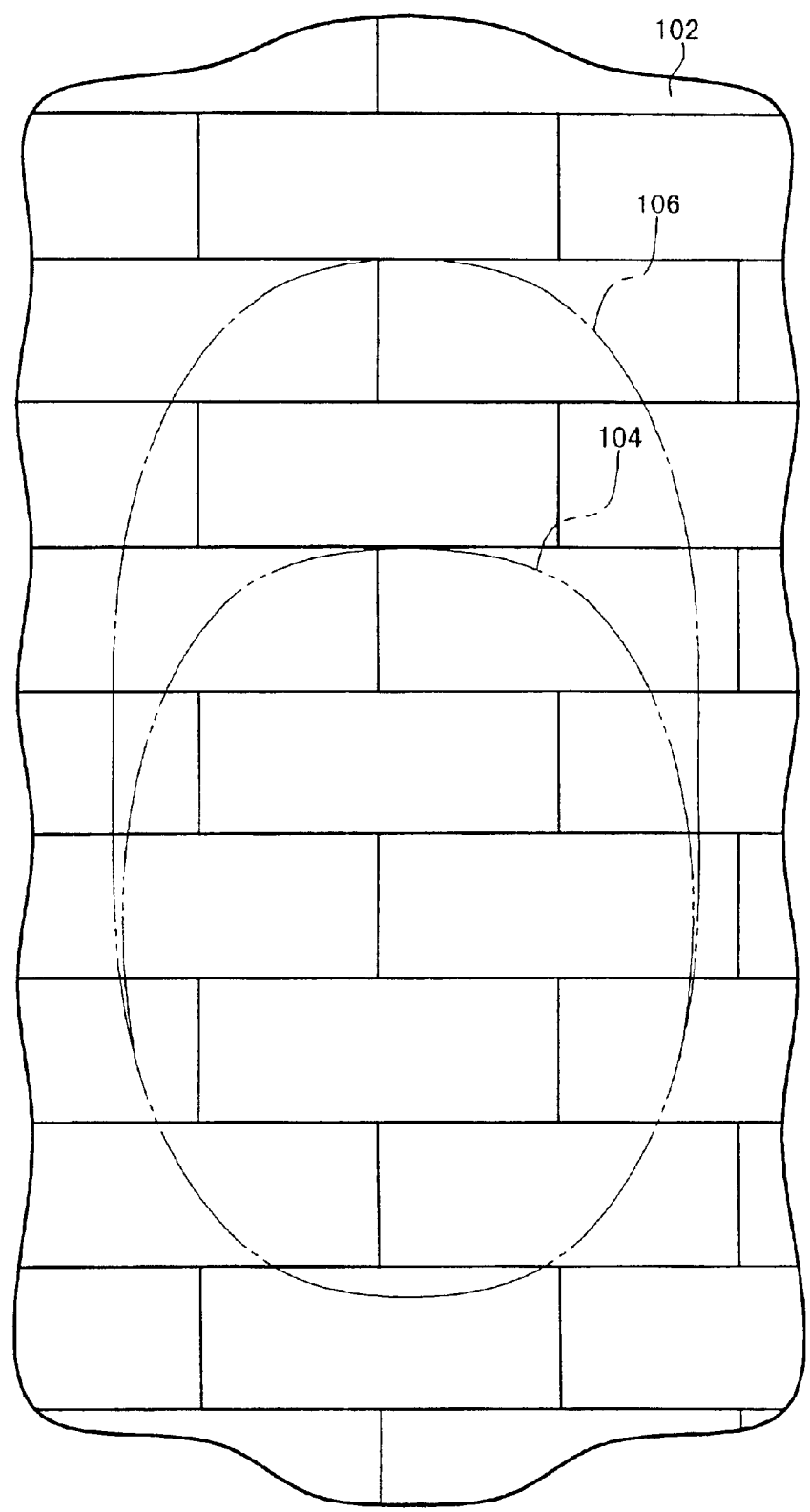
FIG. 4 is a view showing an area (shown by a dashed line) for drawing the shimmering area which includes an area (shown by a two-dot dashed line) for drawing the flame in the background image.

The shimmering area 150 around the flame 100 is drawn in the following manner. It is assumed that the background image of a wall 102 is constructed from a plurality of bricks. An area 106 (shown by a dashed line) of the background image 102 in FIG. 4 is captured as a texture image and drawn in a predetermined area in the texture buffer 244c. The area 106 corresponds to the shimmering area 150, and includes an area 104 (shown by a two-dot dashed line) for drawing the flame 100.

Then, the texture image captured in the texture buffer 244c is altered (animated) according to an animation pattern selected based on a random number. The altered texture image and a mask pattern are combined to draw a composite image as a new background image. The size of the texture image and the size of the mask pattern are the same.

More specifically, a plurality of animation patterns are designed in advance. Each animation pattern comprises an arrangement of motion data. In drawing the shimmering area 150, one animation pattern is selected from the plurality of animation patterns based on, for example, a random number. In each frame, one piece of the motion data is read from the plurality of motion data registered in the selected animation pattern. The read motion data is used to draw an altered texture image which has moved from the previous texture image. In this manner, the texture image moves slowly, i.e., shimmers based on the animation pattern. At this time, the texture image may be blurred.

Figure 5:
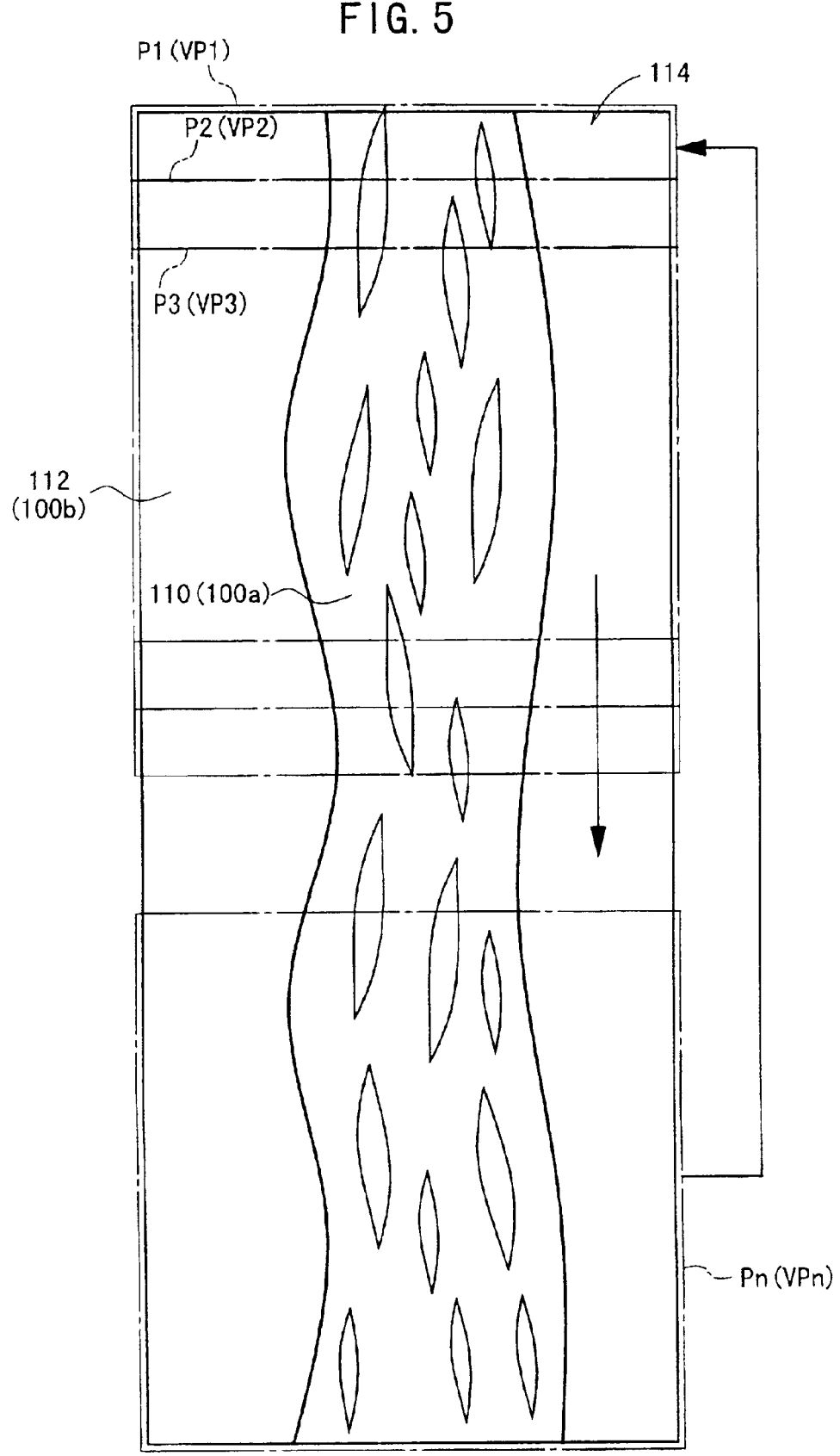
FIG. 5 is a view showing a drawing pattern of the flame.

The randomly changing flame 100 is drawn in the following manner. Firstly, a drawing pattern 114 for the flame 100 is prepared and drawn in the texture buffer 244c, for example. As shown in FIG. 5, the drawing pattern 114 may be generated by combining, for example, two vertically extending patterns, i.e., a yellowish pattern 110 for an inner area 100a of the flame 100 and a reddish pattern 112 for an outer area 100b of the flame 100 (see FIG. 3).

Then, the drawing pattern 114 is partially extracted and drawn in the frame buffer 244a of the image memory 244 for drawing the area 104, i.e., for drawing the flame 100 (see FIG. 4). In FIG. 5, extraction areas of the drawing pattern 114 are indicated by dashed lines P1, P2, . . . , Pn. A drawing pattern VPj corresponding to an extraction area Pj is extracted from the drawing pattern 114. Then, the extracted drawing pattern VPj and a random mask pattern Mj (see FIG. 6) as described later are combined for drawing a composite image in the frame buffer 244a. The extraction area for extracting a part of the drawing pattern 114 is updated sequentially. That is, the position of the extraction area is shifted in every frame downwardly at a predetermined pitch from P1 to P2, from P2 to P3, . . . , from P(n−1) to Pn.

In this manner, the drawing pattern 114 can be expressed as if the drawing pattern 114 were scrolling upwardly. After the extraction area is shifted to the last extraction area Pn and the bottom part of the drawing pattern 114, i.e., the drawing pattern VPn is extracted, the extraction area shifts back to the initial position P1 for extracting the top part of the drawing pattern 114, i.e., the drawing pattern VP1 again.

Figure 6:
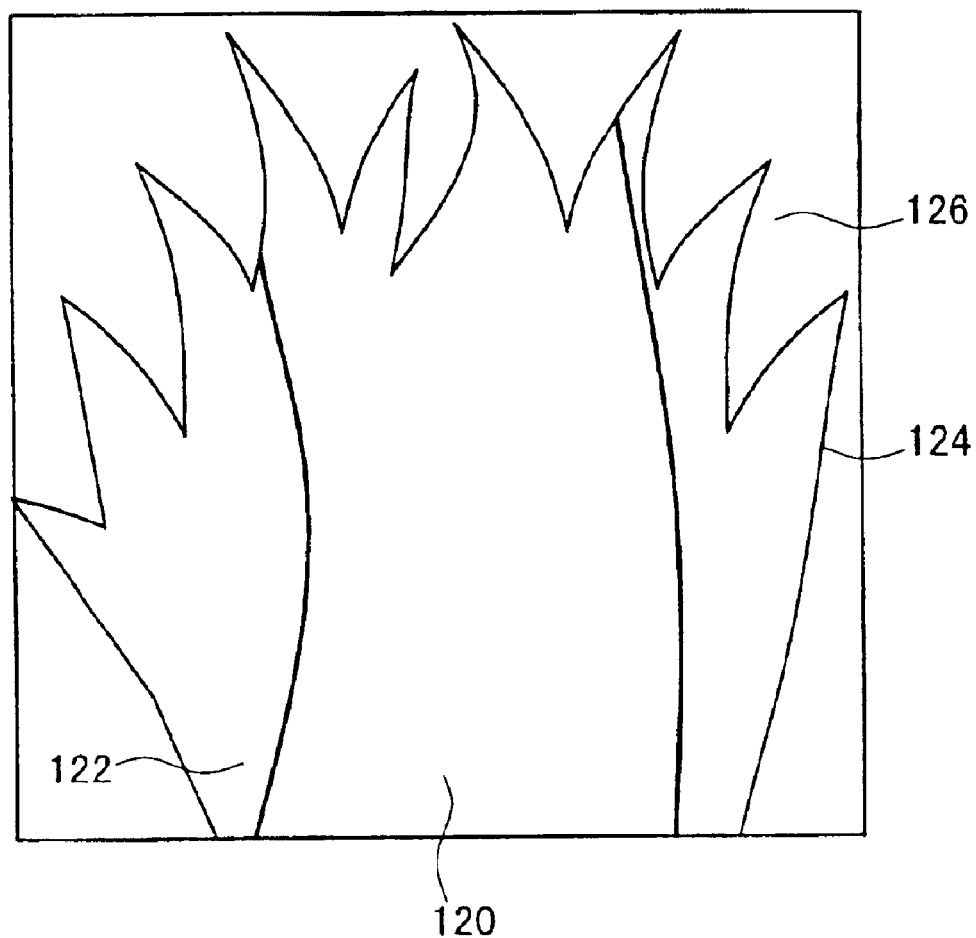
FIG. 6 is a view showing an example of a mask pattern.

In drawing the drawing pattern VPj extracted from the drawing pattern 114 in the frame buffer 244a, the random mask pattern Mj shown in FIG. 6 is selected from a plurality of different mask patterns M1, M2, . . . , Mn. The extracted drawing pattern VPj and the selected mask pattern Mj are combined to draw a composite image.

The mask pattern Mj generally comprises a data arrangement of composition ratios (alpha values) set for respective pixels for combining the background image (wall) 102 and the extracted drawing pattern VPj. That is, each pixel has its alpha value.

For example, the alpha values in the mask pattern Mj are set in the following manner. Alpha values in an area 120 corresponding to the inner area 100a of the flame 100 are selected such that color components of the drawing pattern VPj are predominantly utilized in respective pixels. That is, the drawing pattern VPj is emphasized in the area 120. Alpha values in an area 122 corresponding to the outer area 100b of the flame 100 are selected such that color components of the background image 102 and the color components of the drawing pattern VPj are equally utilized in respective pixels. That is, the image of the drawing pattern VPj is translucent in the area 122. Alpha values on a border 124 corresponding to the outline of the flame 100 are selected such that anti-aliasing is performed. Alpha values in an outer area 126 outside the border 124 of the flame 100 are selected such that only the color components of the background image 102 are utilized in respective pixels.

In this manner, the alpha values are differently set in the respective areas. As described above, the mask pattern Mj selected from the mask patterns M1, M2, . . . , Mn based on a random number, for example, is combined with the extracted drawing pattern VPj to draw a composite image in the frame buffer 244a of the image memory 244.

By repeating the above processing sequence, it is possible to draw a randomly changing object such as the flame 100 easily.

Next, an example of software (image drawing program 300) for carrying out the above-described two characteristic functions, i.e., for drawing the flame 100 and the shimmering area 150 around the flame 100 at the same time, as shown in FIG. 3, will be described with reference to FIGS. 7 through 9.

The image drawing program 300 can be supplied from a randomly accessible recording medium, such as an optical disk 20, a memory card 14 or the like, to the entertainment apparatus 12. Alternatively, the image drawing program 300 can be downloaded via a network such as the Internet or downloaded via a satellite communication or the like to the entertainment apparatus 12. In the following explanation, it is assumed that the image drawing program 300 is supplied from an optical disk 20.

Specifically, the optical disk 20 is played back by the optical disk drive 212 to read the image drawing program 300, and the read image drawing program 300 is stored in the main memory 222 in the control system 200 of the entertainment apparatus 12 by a predetermined process. Thereafter, the image drawing program 300 is executed by the MPU 220 of the control system 200 of the entertainment apparatus 12.

Figure 7:
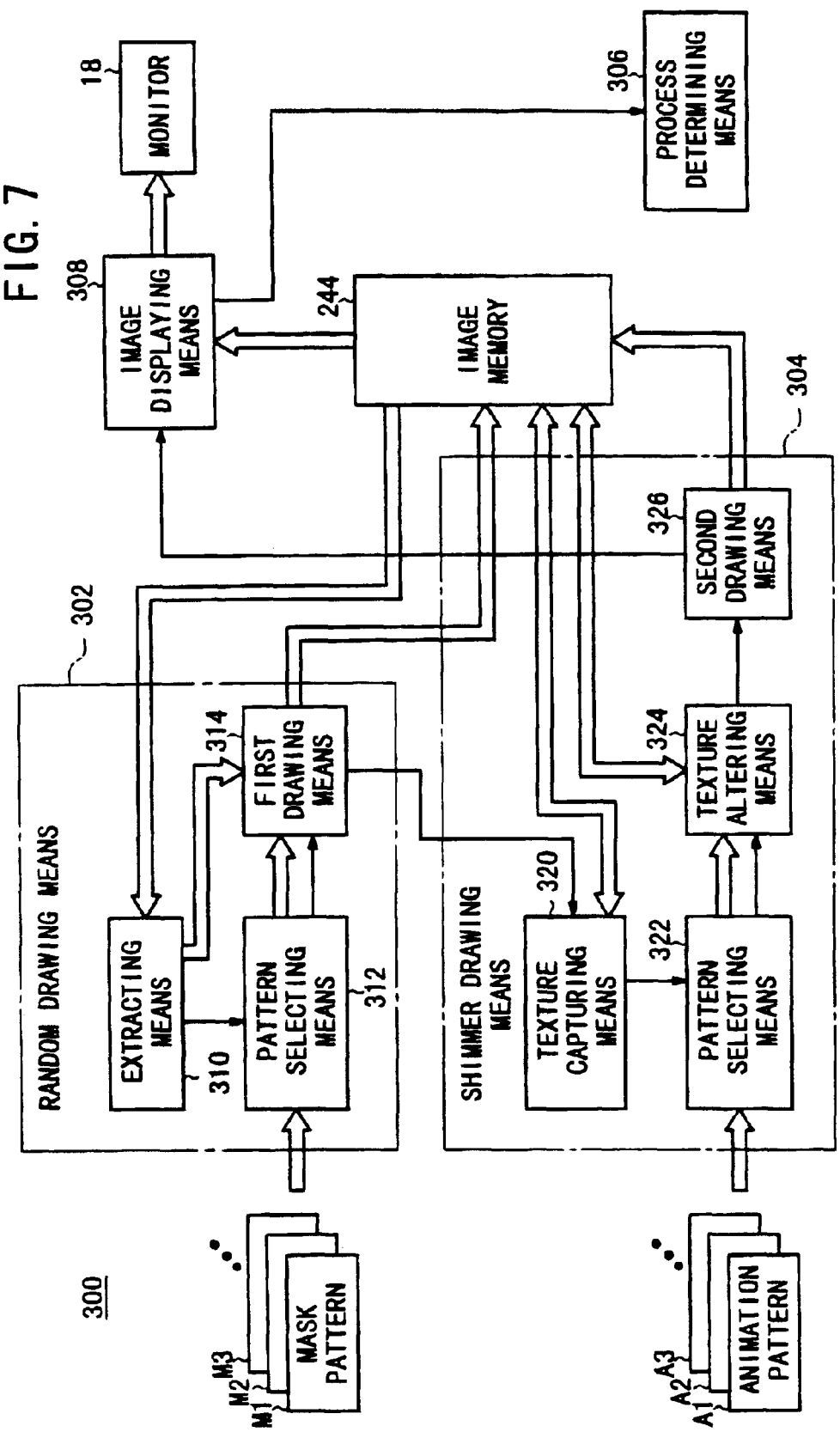
FIG. 7 is a functional block diagram of image drawing means according to the present invention.

As shown in FIG. 7, the image drawing program 300 comprises random drawing means 302, shimmer drawing means 304, process determining means 306, and image displaying means 308.

The random drawing means 302 extracts a partial drawing pattern VPj of an extraction area from the drawing pattern 114 such that the extraction area is shifted by a predetermined distance in one direction in each extraction for allowing the drawing pattern 114 of the flame 100 to move (scroll) at a constant speed. Further, the random drawing means 302 combines the partial drawing pattern VPj and the random mask pattern Mj to draw a composite image. The shimmer drawing means 304 randomly alters a portion of the background image 102 and generates a new background image. Further, the shimmer drawing means 304 combines the new altered portion of the background image and a mask pattern to draw a composite image as the part of the background image 102. The process determining means 306 determines whether or not each of the drawing processes has been finished. The image displaying means 308 outputs image data drawn in the image memory 244 to the monitor 18 so that the outputted image data can be displayed on the screen of the monitor 18.

The random drawing means 302 comprises extracting means 310, pattern selecting means 312, and first drawing means 314. The extracting means 302 extracts a partial drawing pattern VPj of an extraction area from the drawing pattern 114 such that the extraction area is shifted by a predetermined distance in one direction in each extraction for allowing the drawing pattern 114 of the flame 100 to move at a constant speed. The pattern selecting means 312 selects a random mask pattern Mj from a plurality of mask patterns M1, M2, . . . , Mn. The first drawing means 314 combines the partial drawing pattern VPj and the random mask pattern Mj to draw a composite image in the frame buffer 244a of the image memory 244.

The shimmer drawing means 304 comprises texture capturing means 320, pattern selecting means 322, texture altering means 324, and second drawing means 326. The texture capturing means 320 captures a portion of the background image 102 and draws the captured partial background image as a texture image in a predetermined area of the texture buffer 244c. The pattern selecting means 322 selects a random animation pattern Aj from a plurality of animation patterns A1, A2, . . . , An. The texture altering means 324 alters the texture image according to the selected animation pattern Aj. The second drawing means 326 combines the altered texture image and a mask pattern Mj to generate a composite image, and draws the generated composite image in the portion of the background image 102. That is, the composite image is combined with a remaining portion of the background image to draw a revised background image.

Next, the processing sequence of the image drawing program 300 will be described with reference to the flow charts shown in FIGS. 8 and 9.

Figure 8:
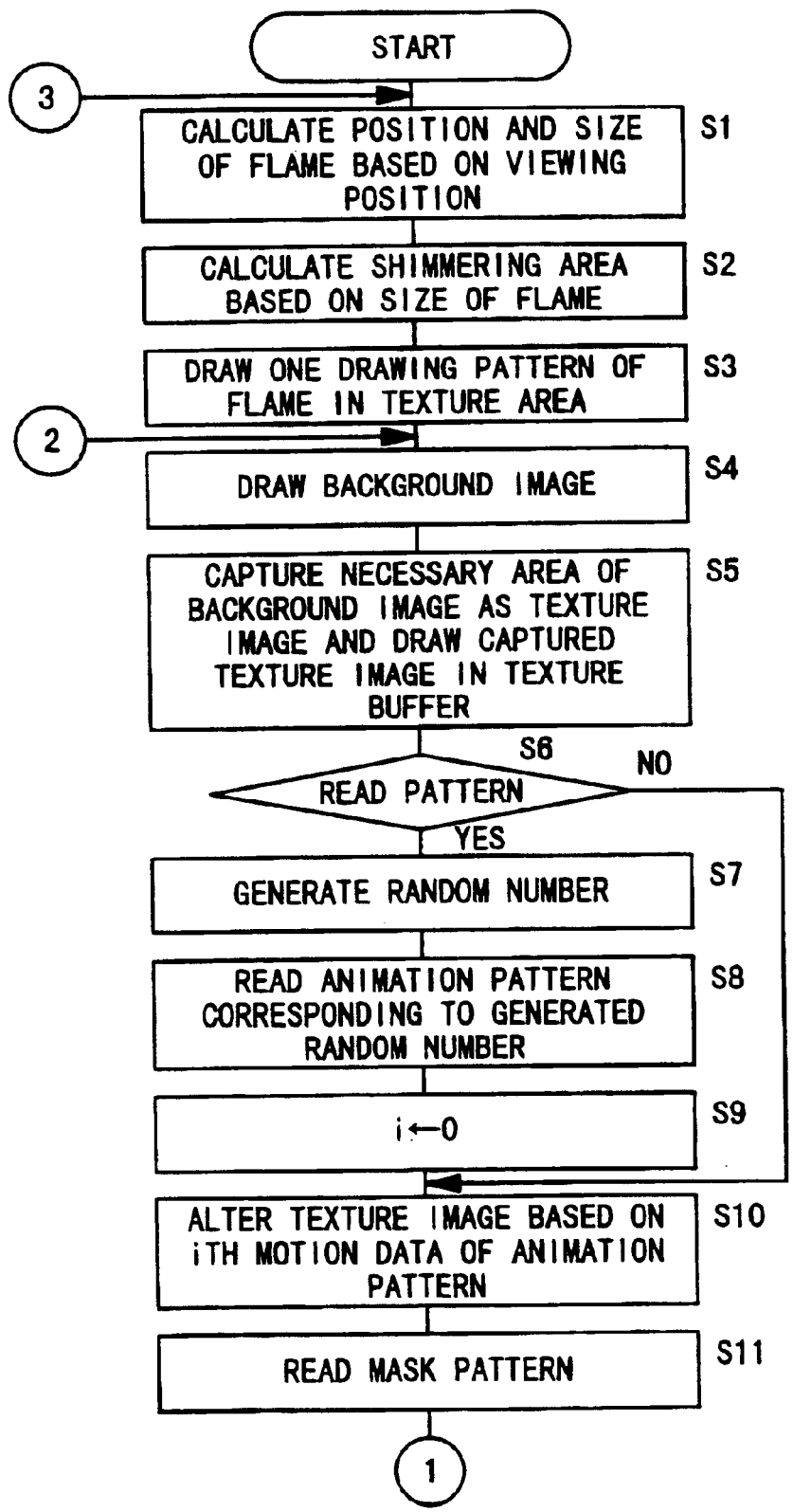
FIG. 8 is a flow chart showing a processing sequence (No. 1) of the image drawing means according to the present invention.

Firstly, in Step S1 of FIG. 8, the image drawing program 300 calculates a position (coordinates) and a size of the flame 100 on the screen based on a position of the flame 100 and a viewing position in the world coordinate system. It is assumed that objects such as the flame 100 are viewed from the viewing position. The viewing position may be a position of a main character in the world coordinate system. However, any suitable position can be used as the viewing position.

Then, in Step S2, the image drawing program 300 calculates an area 106 (see FIG. 4) corresponding to the shimmering area 150 based on the size of the flame 100.

Next, in Step S3, the image drawing program 300 draws the drawing pattern 114 (see FIG. 5) based on the size of the flame 100 in a predetermined area of the texture buffer 244c. Then, in Step S4, the image drawing program 300 draws the background image 102 in the frame buffer 244a of the image memory 244.

Then, control passes to the process of the shimmer drawing means 304. In Step S5, the texture capturing means 320 captures the area 106 of the background image 102 as a texture image and draws the captured texture image in another predetermined area of the texture buffer 244c. The area 106 corresponds to the shimmering area 150.

Then, in Step S6, it is determined whether an animation pattern needs to be read out or not. If it is determined that an animation pattern needs to be read out, control passes to Step S7 for generating a random number. The process is performed when control passes to this routine for the first time, or when all the motion data in the previous animation pattern has been read out, i.e., when the next animation pattern needs to be selected.

Then, in Step S8, the pattern selecting means 322 reads an animation pattern Aj corresponding to the generated random number from a plurality of animation patterns A1, A2, . . . , An. Then, in Step S9, an index register i for reading one piece of the motion data from the animation pattern Aj is initialized.

When the process in Step S9 is finished, or if it is determined that no animation pattern needs to be read out, control passes to Step S10. In Step S10, the texture altering means 324 alters the texture image based on the i-th motion data of the animation pattern Aj.

Then, in Step S11, the second drawing means 326 reads a mask pattern having a size as large as the area 106 (see FIG. 4) corresponding to the shimmering area 150. Then, in Step S12 of FIG. 9, the second drawing means 326 combines the altered texture image and the read mask pattern to generate a composite image. Then, in Step S13, the second drawing means 326 draws the generated composite image at a position based on the coordinate information of the area 106 in the background image 102. Thereafter, in Step S14, the index register i is updated by incrementing the value of the index register i by 1.

Next, the process of the random drawing means 302 is performed. In Step S15, the extracting means 310 extracts a drawing pattern Vpj corresponding to the present extraction area Pj from the drawing pattern 114 of the flame 100 drawn in the predetermined area of the texture buffer 244c.

Then, in Step S16, the pattern selecting means 312 generates a random number for selecting a mask pattern Mj. Then, in Step S17, the pattern selecting means 312 selects the mask pattern Mj corresponding to the random number from a plurality of mask patterns M1, M2, . . . , Mn.

Then, in Step S18, the first drawing means 314 combines the extracted drawing pattern VPj and the selected mask pattern Mj to generate a composite image. In Step S19, the first drawing means 314 draws the generated composite image at a position based on the coordinate information of the flame 100, i.e., at the substantially central area 104 in the shimmering area 106. Thereafter, in Step S20, the extraction area Pj is updated. That is, the extraction area is shifted downwardly in each frame at a predetermined pitch. When the present extraction area is shifted to the last extraction area Pn and the bottom part of the drawing pattern 114, i.e., the drawing pattern VPn is extracted, the extraction area is shifted back to the initial area P1 for extracting the top part of the drawing pattern 114, i.e., the drawing pattern VP1 again.

Next, in Step S21, the image displaying means 308 outputs image data drawn in the image memory 244 to the monitor 18 so that the outputted image data can be displayed on the screen of the monitor 18.

Then, in Step S22, the process determining means 306 determines whether the viewing position has been changed or not. If the viewing position has not been changed, control passes back to Step S4 in FIG. 8 for repeating the subsequent steps.

By repeating the above processing sequence in Step S4 through Step S22, the randomly changing flame 100 and the shimmering area around the flame 100 can be expressed on the background image 102.

If it is determined that the viewing position has been changed in Step S22, control passes to Step S23. In Step S23, the process determining means 306 determines whether or not there is a program ending request (game over, power off, etc.) to the image drawing program 300.

If it is determined that there is no program ending request, control passes back to Step S1 for calculating the position and size of the flame 100 based on the motion data, and passes to Step S2 for repeating the subsequent steps.

Figure 9:
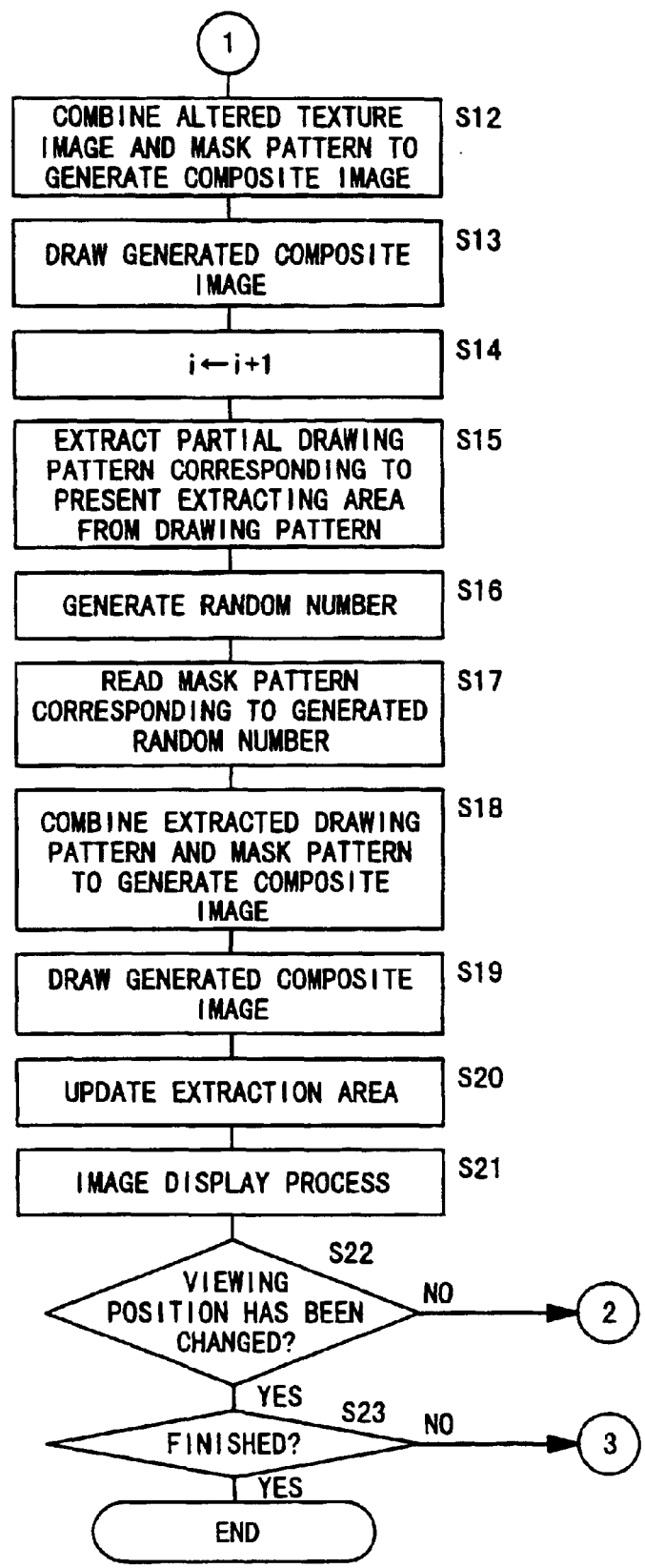
FIG. 9 is a flow chart showing another processing sequence (No. 2) of the image drawing means according to the present invention.

If it is determined that there is a program ending request in Step S23 in FIG. 9, the process of the image drawing program 300 is brought to an end.

As described above, the random drawing means 302 of the present invention can draw an image of a randomly changing object such as the flame 100 by repeating a processing sequence comprising the steps of extracting a partial drawing pattern VPj of an extraction area from a drawing pattern 114 of the randomly changing object (flame 100) such that the extraction area is shifted by a predetermined distance in one direction in each extraction, and combining the extracted partial drawing pattern VPj and a random mask pattern Mj to draw a composite image.

That is, it is possible to easily draw a realistic image of a randomly changing object such as a flame, smoke, or flowing water. Such an image can be utilized for drawing a background image for allowing a user to enjoy an exciting video game, for example.

Further, the shimmer drawing means 304 of the present invention can draw a shimmering image in a background image 102 by repeating a processing sequence comprising the steps of randomly altering a part of the background image 102 to generate a new altered image, combining the new image and a mask pattern to generate a composite image, and drawing the composite image as the part of the background image 102.

That is, it is possible to easily draw a realistic image of a shimmering image of an object or an area which shimmers under the influence of heat waves of a flame, exhaust air or the like. Such an image can be utilized for drawing an area around a flame or exhaust air from a motor vehicle in a background for allowing a user to enjoy an exciting video game, for example.

Further, the image drawing program 300 of the present invention can draw an image of a randomly changing object and a shimmering image around the randomly changing object by repeating a processing sequence comprising the steps of randomly altering a part of a background image 102 to generate a new altered image, combining the new image and a mask pattern to draw a composite image as the part of the background image 102, extracting a partial drawing pattern VPj of an extraction area from a drawing pattern 114 of the randomly changing object 100 such that the extraction area is shifted by a predetermined distance in one direction in each extraction, and combining the extracted partial drawing pattern VPj and another mask pattern Mj to draw another composite image in the part of the background image 102. That is, it is possible to easily draw a realistic image of a randomly changing object such as a flame, smoke, or flowing water, and a realistic image of a shimmering image around the randomly changing object. Such images can be utilized for drawing a randomly changing flame and a shimmering area around the flame in a background image for allowing a user to enjoy an exciting video game, for example.

The image drawing method, the image drawing apparatus, the recording medium, and the program according to the present invention shall not be limited to the particular embodiment disclosed herein. It will be apparent to a person skilled in the art that numerous modifications and variation may be made without departing from the spirit and scope of the invention.

What is claimed is:

1. A method of displaying images of a first image moving against a background and a second image of shimmering background associated with the first image, comprising:
   (a) determining first and second rendering areas in a background image;
   (b) extracting a first image portion from an image rendering pattern of a first image, said image rendering pattern comprising a plurality of first image display portions extractable in a sequence to display different extracted portions of said pattern to simulate motion of said first image;
   (c) combining a first mask pattern with said first image portion to generate and render an object image in said first rendering area, said first mask pattern comprising background image information and first image information;

(d) extracting a second image from said second rendering area and generating a new second image by arbitrarily moving said second image;

(e) combining said new second image with a second mask pattern to generate and render a shimmering image of the background in said second rendering area; and (f) repeating steps (b) through (e) to extract additional image portions from said image rendering pattern, combine said first mask pattern with said additional image portions, generate new second images by arbitrarily moving said second image, and combine said new second images with said second mask pattern to generate and render shimmering images of the background.

2. The method according to claim 1, wherein said generating a new second image comprises applying a randomly selected animation pattern to said extracted second image.

3. The method according to claim 1, further comprising selecting said first mask pattern from a plurality of mask patterns.

4. The method according to claim 1, wherein extracting additional image portions from said image rendering pattern comprises extracting subsequent portions of said image portions adjacent to previous portions of said extracted image portions.

5. Apparatus for displaying images of a first image moving against a background and a second image of shimmering background associated with the first image, comprising:

(a) means for determining first and second rendering areas in a background image;

(b) means for extracting a first image portion from an image rendering pattern of a first image, said image rendering pattern comprising a plurality of first image display portions extractable in a sequence to display different extracted portions of said pattern to simulate motion of said first image;

(c) means for combining a first mask pattern with said first image portion to generate and render an object image in said first rendering area, said first mask pattern comprising background image information and first image information;

(d) means for extracting a second image from said second rendering area and generating a new second image by arbitrarily moving said second image; and (e) means for combining said new second image with a second mask pattern to generate and render a shimmering image of the background in said second rendering area;

wherein said means for extracting a first image portion extracts additional image portions from said image rendering pattern, said means for combining a first mask pattern combines said first mask pattern with said additional image portions, said means for extracting a second image generates new second images by arbitrarily moving said second image, and said means for combining said new second image combines said new second images with said second mask pattern to generate and render shimmering images of the background.

6. The apparatus according to claim 5, wherein said means for generating a new second image comprises means for applying a randomly selected animation pattern to said extracted second image.

7. The apparatus according to claim 5, further comprising means for selecting said first mask pattern from a plurality of mask patterns.

8. The apparatus according to claim 5, wherein said means for extracting additional image portions from said image rendering pattern comprises means for extracting subsequent portions of said image portions adjacent to previous portions of said extracted image portions.

9. A recording medium recorded with a program and data for displaying images of a first image moving against a background and a second image of shimmering background displayed associated with the first image, said program comprising instructions for causing a computer to:

(a) determine first and second rendering areas in a background image;

(b) extract a first image portion from an image rendering pattern of a first image, said image rendering pattern comprising a plurality of first image display portions extractable in a sequence to display different extracted portions of said pattern to simulate motion of said first image;

(c) combine a first mask pattern with said first image portion to generate and render an object image in said first rendering area, said first mask pattern comprising background image information and first image information;

(d) extract a second image from said second rendering area and generate a new second image by arbitrarily moving said second image;

(e) combine said new second image with a second mask pattern to generate and render a shimmering image of the background in said second rendering area; and (f) repeat steps (b) through (e) to extract additional image portions from said image rendering pattern, combine said first mask pattern with said additional image portions, generate new second images by arbitrarily moving said second image, and combine said new second images with said second mask pattern to generate and render shimmering images of the background.

10. The recording medium according to claim 9, wherein said generating a new second image comprises applying a randomly selected animation pattern to said extracted second image.

11. The recording medium according to claim 9, further comprising selecting said first mask pattern from a plurality of mask patterns.

12. The recording medium according to claim 9, wherein said extracting additional image portions from said image rendering pattern comprises extracting subsequent portions of said image portions adjacent to previous portions of said extracted image portions.

13. A program readable and executable by a computer for displaying images of a first image moving against a background and a second image of shimmering background associated with the first image, said program comprising:

(a) determining first and second rendering areas in a background image;

(b) extracting a first image portion from an image rendering pattern of a first image, said image rendering pattern comprising a plurality of first image display portions extractable in a sequence to display different extracted portions of said pattern to simulate motion of said first image;

(c) combining a first mask pattern with said first image portion to generate and render an object image in said first rendering area, said first mask pattern comprising background image information and first image information;

(d) extracting a second image from said second rendering area and generating a new second image by arbitrarily moving said second image;

(e) combining said new second image with a second mask pattern to generate and render a shimmering image of the background in said second rendering area; and (f) repeating steps (b) through (e) to extract additional image portions from said image rendering pattern, combine said first mask pattern with said additional image portions, generate new second images by arbitrarily moving said second image, and combine said new second images with said second mask pattern to generate and render shimmering images of the background.

* * * * *